United States Patent
Lennox

[11] 3,891,998
[45] July 1, 1975

[54] ENDOPROSTHETIC SHOULDER JOINT

[75] Inventor: William Murdoch Lennox, Cheltenham, England

[73] Assignee: National Research Development Corporation, London, England

[22] Filed: Jan. 7, 1974

[21] Appl. No.: 431,403

[30] Foreign Application Priority Data
Jan. 12, 1973  United Kingdom............... 1788/73

[52] U.S. Cl. ............................... 3/1.91; 128/92 C
[51] Int. Cl. ............................................. A61f 1/24
[58] Field of Search .......... 3/1, 1.9, 1.91; 128/92 C, 128/92 CA, 92 R

[56] References Cited
UNITED STATES PATENTS
| | | |
|---|---|---|
| 3,715,763 | 2/1973 | Link............................................ 3/1 |
| 3,728,742 | 4/1973 | Averill et al................................ 3/1 |
| 3,744,061 | 7/1973 | Frost........................................... 3/1 |

OTHER PUBLICATIONS
"Neer Shoulder Prostheses" and Moseley Glenoid Rims, Vitallium Surgical Appliance (Catalog), Anstenal Medical Div., Howmet Corp., New York, N.Y., 1964, p. 55.

*Primary Examiner*—Ronald L. Frinks
*Attorney, Agent, or Firm*—Cushman, Darby & Cushman

[57] ABSTRACT

An endoprosthetic scapular glenoid component is provided with a concave bearing surface of elongated part-spherical shape significantly less than hemispherical extent. The surface forms the larger end face of a generally frusto-pyramidal body of which the side faces have a relieved structure for fixation in the scapular with gap-filling cement. The pyramidal body is preferably quadrilateral with two opposed planar side faces and the other two convexly rounded. For use in a total shoulder joint device, the glenoid component can be associated with a variety of generally spherically headed, intramedullary stemmed, humeral components. Preferably the humeral component head is of minor segmental form, and the stem inclined relative to the head over a major free end portion of its length.

9 Claims, 5 Drawing Figures

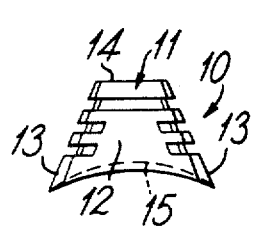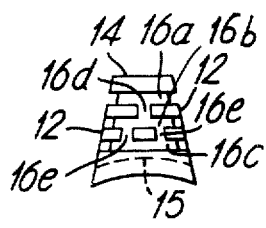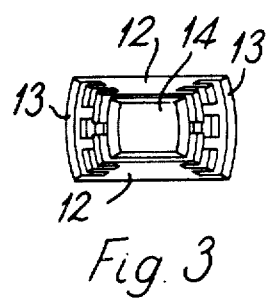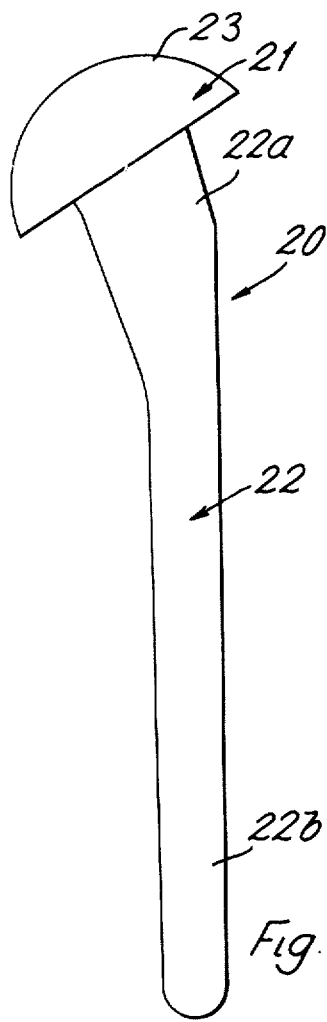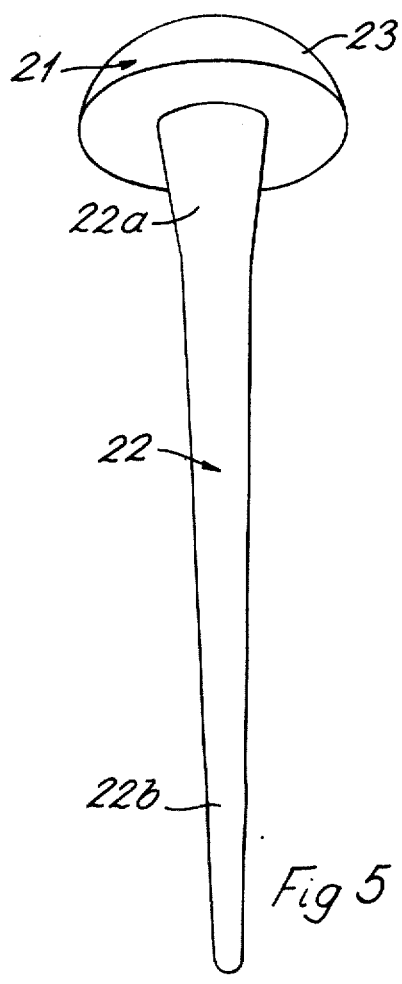

ENDOPROSTHETIC SHOULDER JOINT

This invention concerns prosthetic devices and, more particularly, endoprosthetic shoulder joint devices.

Until very recently the only commercially available forms of the latter devices comprised humeral head devices for use in what can be termed partial replacements in which the relevant device co-operates with the natural glenoid cavity of the scapula. This situation has now changed in that at least one device is now available which device is of two-part form involving both scapular glenoid and humeral head components. Superficially such a two-part device is not unlike those for a total replacement hip joint prosthesis in that, in both cases, one component provides a socket of at least hemispherical form and the other component comprises a hemispherically shaped head for articulating bearing engagement in the socket. However, development of the shoulder devices has been later than might otherwise have been expected in view of the earlier development of the hip devices, and this delay has arisen because of the seemingly different and largely more complex anatomical, physiological and mechanical considerations in the shoulder joint compared to the hip joint. These considerations have led to differences in the shoulder devices from the hip devices which differences, while concerning detail, are significant. In the result those proposals for total shoulder replacement which have been made up to the present time involve relatively complex component structures, at least in respect of the scapular component and its adaptation for fixation. Also, it is a feature of these proposals to date that the relevant devices, while simulating the articulating function of the natural joint, do not closely simulate the natural joint in bearing surface geometry.

The present invention derives from a proposition which is contrary, at least in some significant respects, to those referred to above and leads to an endoprosthesis which is of simpler form and more closely simulates the geometry of the natural shoulder joint.

In a more general aspect the present invention provides, for a shoulder joint endoprosthesis, a scapular glenoid component having a concave bearing surface of substantially part-spherical shaping, which shaping is of significantly less than hemispherical extent, and of elongated circumferential form, and which component is adapted remotely from said surface for fixation to the scapula.

In a preferred form the proposed component comprises a body of generally frusto-pyramidal shaping having its wider end face dished to provide said bearing surface, and being adapted for said fixation by the provision of a relatively low relief structure extending over its side surfaces to afford a key for a gap-filling medium.

Use of such a component in a total shoulder joint endoprosthesis is preferably in association with a humeral component of similar form to those used hitherto in partial endoprostheses, although use of humeral components of similar form to those proposed for other total endoprostheses may be possible.

In any event, in another aspect of the invention there is provided an endoprosthetic shoulder joint device comprising a scapular glenoid component of the above-proposed form, and a humeral component, the latter component comprising a head part having a convex bearing surface for mutual articulating bearing engagement with said concave surface, which convex surface is of at least approximately part-spherical form, with a range of curvature including that of said concave bearing surface, and of not greater than hemispherical extent, and said head part being adapted remotely from said convex bearing surface for fixation to the humerus.

In a preferred form of this aspect of the invention said convex bearing surface is substantially part-spherically shaped, with like radius as that of said concave bearing surface, and is of segmental form extending over about a one third spherical area.

In another form of this aspect of the invention said convex bearing surface is also of generally spherical segmental shaping, the surface being symmetrical about a diametral plane therethrough which corresponds, in use of the device, with the direction of elongation of said concave bearing surface, but it has increasing curvature towards one end thereof in said plane to render the surface non-symmetrical in the direction of said plane.

In either case, it is also preferred that the fixation adaptation of the humeral component comprise the provision of an intramedullary stem extending part, said head port, remotely from said convex surface, when appropriate in said plane, and inclined towards said one end.

In order that the above aspects of the invention may be more fully and clearly understood, one embodiment of a total shoulder joint endoprosthetic device according to the invention will now be described by way of example with reference to the accompanying drawings, in which:

FIGS. 1, 2 and 3 diagrammatically illustrate the scapular glenoid component of the relevant embodiment in respective orthogonal side elevations and underneath plan view, and FIGS. 4 and 5 similarly illustrate the associated humeral component in respective orthogonal side elevations.

The illustrated scapular component is denoted generally at 10 and comprises a body 11 of plastics material, such as high density polyethylene, formed to a generally frusto-quadrilateral-pyramidal shape having one pair of like, opposed, planar side faces 12, another pair of like, opposed, convexly circularly rounded side faces 13, the circular curvature of the faces 13 extending orthogonally relative to the longitudinal direction of the body 10, a planar smaller end face 14, and a concavely dished larger end face 15. The body 11 can be regarded as formed from a right-circular-cone which has its apex-ended portion removed by a cut parallel to the base, its base concavely dished, and side portions removed by symmetrically-opposed, mutually convergent, planar cuts.

The concave dishing is of part-spherical shaping, which shaping is significantly less than hemispherical and so relatively shallow, and this shaping is also elongated by virtue of the absent side face portions of the notionally original cone.

The remaining feature of the illustrated scapular component involves the provision of a relatively low relief structure in the side faces of the body 11 by way of grooves 16 therein. There are three such grooves 16a, 16b and 16c extending circumferentially around each side face 13 in like mutually-spaced parallel manner. The corresponding ones 16a of these grooves nearer the smaller end face 14 continue across the side faces 12 to meet and so form a single annular groove, while the grooves 16b and 16c continue partway across the side faces 12 without meeting. Also, on each side face 13, the annular groove 16a and next adjacent circumferential groove 16b are communicated by a single longitudinally directed groove 16d, and the circumferential grooves 16b and 16c by two such grooves 16e.

The illustrated humeral component is denoted generally at 20 and comprises an integral construction, of metal such as a suitable chromium-cobalt alloy, including a head part 21 and a stem 22 extending therefrom. The head part 21 has a convex face 23 which is of spherical segmental shaping having a like radius as the concave face 15 and extending over an area equivalent to about one third of the corresponding total sphere. In this last connection it is to be noted that the face 23 has a significantly larger surface area than that of the face 15, but not greater than hemispherical.

The stem 22 has a wider and shorter shank part 22a of curved or cranked form which is connected with the head part 21 remotely from the face 23, and a narrower and longer free end part 22b of substantially rectilinear form, although it is preferably tapered (as shown in FIG. 5) in at least one lateral direction.

In use of the illustrated components the scapular glenoid cavity is excavated for securement of the scapular component 10 therein in association with acrylic cement or equivalent gap-filling medium, while the humeral head is sectioned for abutment of the head part 21 of the humeral component 20 thereon and the respective medullary canal is reamed for securement of the stem 22 therein with cement. These component securements leave the faces 15 and 23 exposed to be held in mutual articulating bearing engagement by members of the natural joint capsule for articulation under natural muscle and ligament action. It will be appreciated that the bearing surfaces of the overall endoprosthetic device closely simulate the natural surfaces replaced thereby more closely than a ball head of major spherical-sectoral shaping engaged in a hemispherical socket as proposed by others; the humeral component form is no more complex than others proposed for partial joint replacement, and involves less removal of bone than a fuller ball-headed component; and that the scapular component is of simple form requiring a reduced amount of bone removal, without incursion of spikes or equivalent members into the acromion process, caracoid process, and margin of the scapula as proposed by others.

While the invention has been described with more particular reference to the illustrated embodiment, it is not intended to be limited thereby but is capable of variation within the scope of the broader introductory discussion thereof. For example the specified form of pyramidal or tapered shaping for the scapula component can be varied, as can the specified form of low relief structure thereon. Similarly, the humeral component can have a convex bearing surface of generally spherical segmental, but non-symmetrical in one sense, shaping as discussed in the earlier introductory passages. This allows a closer simulation of the corresponding natural humeral surface, but such a close degree of simulation is unlikely to give added advantage while, at the same time, it will involve added complexity in production. As a variation in the opposite sense, as it were, the more generally proposed form of scapular component may be associated with a ball-headed humeral, intramedullary-stemmed, component of the form proposed by others.

I claim:

1. An endoprosthetic scapular glenoid component comprising a single body of generally frusto-pyramidal overall shaping, said body having its wider end face dished to define a concave bearing surface of substantially part-spherical shaping to an extent significantly less than hemispherical, and having an elongated circumferential form, and the side surfaces of said body being formed with a low-relief structure to afford a key for a gap-filling medium.

2. A component according to claim 1 wherein said pyramidal shaping is of quadrilateral form.

3. A component according to claim 2, wherein said quadrilateral form comprises two like opposed planar side faces and two like opposed convexly circularly rounded side faces.

4. A component according to claim 3, wherein said low relief structure comprises at least two grooves extending laterally around the side faces of said pyramidal shaping, and at least one further groove extending longitudinally between said two grooves to communicate the same.

5. An endoprosthetic shoulder joint device comprising a scapular glenoid component according to claim 1 and a humeral component, said humeral component including a head part having a convex bearing surface in mutual articulating bearing engagement with said concave bearing surface, which convex bearing surface is of at least approximately part-spherical form of significantly greater circumferential extent than, and with a range of curvature including that of, said concave bearing surface, and said head part being adapted remotely from said convex bearing surface for fixation to the humerus.

6. A device according to claim 5 wherein said convex bearing surface is of substantially spherical segment shape with like radius as said concave bearing surface and a circumferential extent not greater than hemispherical extent.

7. A device according to claim 6 wherein said segment shape extent is equivalent to about a one third spherical area.

8. A device according to claim 5 wherein said humeral component is adapted for fixation to the humerus by the provision of an elongate intramedullary stem extending from said head part, remotely from said convex bearing surface, which stem is inclined relative to said head part over a major, free end portion thereof.

9. An endoprosthetic shoulder joint device comprising: a scapular glenoid component as a single body of generally frusto-pyramidal overall shaping having its wider end face dished to define a concave bearing surface of part-spherical shaping to an extent significantly less than hemispherical, and the side surfaces of said body being formed with a low-relief structure to afford a key for a gap-filling medium; and a humeral component including a head part defining a convex, part-spherically shaped bearing surface of significantly greater extent than, and in mutually articulatory engagement with, said concave bearing surface, and an elongated intramedullary stem extending from said head part, remotely from said convex bearing surface, which stem is inclined relative to said head over a major free end portion thereof.

* * * * *